United States Patent
Cui et al.

(10) Patent No.: US 10,954,372 B2
(45) Date of Patent: Mar. 23, 2021

(54) WATER SOLUBLE SHOPPING BAG AND PREPARATION METHOD THEREOF

(71) Applicants: POLYE MATERIALS CO., LTD., Qingyuan (CN); SOLUBAG SPA, Santiago (CL)

(72) Inventors: Yuefei Cui, Guangdong (CN); Robeto Astete Boettcher, Santiago (CL); Bin Xie, Qingyuan (CN)

(73) Assignees: POLYE MATERIALS CO., LTD.; SOLUBAG SPA

( * ) Notice: Subject to any disclaimer, the term of this patent is extended or adjusted under 35 U.S.C. 154(b) by 0 days.

(21) Appl. No.: 16/330,375

(22) PCT Filed: Sep. 5, 2017

(86) PCT No.: PCT/CN2017/100434
§ 371 (c)(1),
(2) Date: Oct. 3, 2019

(87) PCT Pub. No.: WO2018/041262
PCT Pub. Date: Mar. 8, 2018

(65) Prior Publication Data
US 2020/0024438 A1   Jan. 23, 2020

(30) Foreign Application Priority Data
Sep. 5, 2016  (CN) .......................... 201610801616.8

(51) Int. Cl.
*C08L 29/04*   (2006.01)
*C08K 13/02*   (2006.01)
(Continued)

(52) U.S. Cl.
CPC .......... *C08L 29/04* (2013.01); *B29C 48/0018* (2019.02); *B29C 48/10* (2019.02);
(Continued)

(58) Field of Classification Search
CPC ... C08L 29/04; B29C 48/0018; B29C 48/288; C08K 13/02; C08K 3/04; C08K 5/098;
(Continued)

(56) References Cited

U.S. PATENT DOCUMENTS 5,543,270 A * 8/1996 Akao ................... C08K 5/0075
206/316.1
2007/0122455 A1 * 5/2007 Myers ................... A61K 47/38
424/439
(Continued)

FOREIGN PATENT DOCUMENTS

AU    2003282249 A1   6/2004
AU    2003282249 B2   2/2008
(Continued)

OTHER PUBLICATIONS

PCT/CN2017/100434 (application this 371 application is based off of), Written Opinion of the International Searching Authority, dated Dec. 11, 2017.
(Continued)

*Primary Examiner* — Tahseen Khan
(74) *Attorney, Agent, or Firm* — Muskin and Farmer LLC

(57) ABSTRACT

A water-soluble shopping bag and a preparation method thereof. The water-soluble shopping bag consists of the following components according to the following parts by weight: 100 parts of polyvinyl alcohol, 8-20 parts of a composite plasticizer; 10-30 parts of a polysaccharide and the derivative thereof; 1-5 parts of a processing aid, 0.1-0.5 parts of a film slipping agent and 0.5-3.0 parts of a film anti-blocking agent. The preparation method comprises the following steps: mixing the components according to the parts by weight, extruding the mixture to form pellets after mixing, then performing blow molding to form a film, and then preparing various types and sizes of water-soluble shopping bags. The water-soluble shopping bag has higher
(Continued)

bearing capacity and cold water solubility, is suitable for use in water-free environment, and dissolves upon contacting water without producing pollution after being used.

17 Claims, 1 Drawing Sheet

(51) Int. Cl.

| | |
|---|---|
| *B29C 48/10* | (2019.01) |
| *B29C 48/285* | (2019.01) |
| *B29C 48/00* | (2019.01) |
| *C08K 3/04* | (2006.01) |
| *C08K 5/00* | (2006.01) |
| *C08K 5/053* | (2006.01) |
| *C08K 5/06* | (2006.01) |
| *C08K 5/098* | (2006.01) |
| *C08K 5/17* | (2006.01) |
| *C08K 5/20* | (2006.01) |
| *B29K 29/00* | (2006.01) |
| *B29L 31/00* | (2006.01) |
| *C08K 3/22* | (2006.01) |
| *C08K 3/26* | (2006.01) |

(52) U.S. Cl.
CPC .............. *B29C 48/288* (2019.02); *C08K 3/04* (2013.01); *C08K 5/0016* (2013.01); *C08K 5/053* (2013.01); *C08K 5/06* (2013.01); *C08K 5/098* (2013.01); *C08K 5/17* (2013.01); *C08K 5/20* (2013.01); *C08K 13/02* (2013.01); *B29C 2948/92647* (2019.02); *B29K 2029/04* (2013.01); *B29L 2031/7128* (2013.01); *C08K 2003/2217* (2013.01); *C08K 2003/2241* (2013.01); *C08K 2003/265* (2013.01)

(58) Field of Classification Search
CPC ... C08K 5/17; C08K 5/20; C08K 5/06; C08K 5/0016; C08K 5/053
USPC .......................................................... 428/220
See application file for complete search history.

(56) References Cited

U.S. PATENT DOCUMENTS

| | | | |
|---|---|---|---|
| 2017/0226298 A1* | 8/2017 | Friedrich | ............... B65D 75/04 |
| 2017/0275394 A1* | 9/2017 | Mori | .......................... C08J 3/18 |

FOREIGN PATENT DOCUMENTS

| | | |
|---|---|---|
| AU | 2015333710 A1 | 4/2017 |
| CA | 2504940 A1 | 6/2004 |
| CA | 2963697 | 4/2016 |
| CN | 1711307 A | 12/2005 |
| CN | 1314735 C | 5/2007 |
| CN | 101085850 A | 12/2007 |
| CN | 101085850 B | 3/2011 |
| CN | 105646922 A | 6/2016 |
| CN | 106380765 A | 2/2017 |
| CN | 107108920 A | 8/2017 |
| EP | 1378564 A1 | 1/2004 |
| EP | 1560875 | 8/2005 |
| EP | 1560875 B1 | 1/2010 |
| EP | 3207085 A2 | 8/2017 |
| JP | 2006506501 A | 2/2006 |
| KR | 20170067866 A | 6/2017 |
| MX | 2017004811 A | 7/2017 |
| NZ | 539851 A | 3/2007 |
| TW | 200415191 A | 8/2004 |
| TW | 201619273 A | 6/2016 |
| WO | 2004005448 A1 | 1/2004 |
| WO | 2004046229 A1 | 6/2004 |
| WO | 2016061069 A2 | 4/2016 |
| WO | 2016061069 A3 | 7/2016 |

OTHER PUBLICATIONS

PCT/CN2017/100434 (application this 371 application is based off of), International Search Report, dated Dec. 11, 2017.

* cited by examiner

WATER SOLUBLE SHOPPING BAG AND PREPARATION METHOD THEREOF

CROSS REFERENCE TO PRIOR APPLICATIONS

This application is the U.S. National Phase application under 35 U.S.C. § 371 of International Application PCT/CN2017/100434, filed on Sep. 5, 2017, which claims the benefit of Chinese Patent Application 201610801616.8 filed in China on Sep. 5, 2016, both applications are incorporated by reference herein in their entireties.

FIELD OF THE INVENTION

The present invention relates to an environmental-friendly shopping bag, and more particularly to an environmental-friendly shopping bag with cold water solubility and a preparation method thereof.

BACKGROUND OF THE INVENTION

At present, shopping bags used in commercial shopping malls are plastic shopping bags. One type refers to the plastic shopping bags made of common plastics, such as polyethylene (PE), polypropylene (PP), polyvinyl chloride (PVC) and the like. The use of the plastic shopping bags brings convenience to customers and also brings a large amount of plastic garbage to the natural environment. Because such plastic bags are difficult to degrade in the natural environment, a large amount of white pollution is generated in the natural environment, damaging the soil, polluting the water quality of water sources and causing serious harm to the natural ecology. Another type refers to disposable biodegradable shopping bags made of biodegradable materials, such as PLA, PBS, PBAT and the like, and these shopping bags can be biodegraded in the natural environment, thus avoiding pollution and harm to the natural environment. However, due to the high manufacturing cost, the selling price of these materials is generally more than 3 times higher than that of ordinary plastics, so that the use range of these shopping bags is limited by the price and it is difficult to widely popularize and use them. Moreover, biodegradation in the natural environment also requires a certain time. According to the present invention, aiming at the defects and deficiencies of the common shopping bag, an environmentally friendly shopping bag with biodegradability and water solubility is developed.

As a water-soluble polymer, polyvinyl alcohol (PVA) is widely used in viscose fiber, adhesive, coating and other fields. Meanwhile, polyvinyl alcohol has biodegradability, and its biological oxygen consumption and chemical oxygen consumption in water are extremely low, thus causing no pollution or damage to water quality. The dissolution of polyvinyl alcohol into the soil not only does not cause pollution and damage to the soil, but also has the effects of improving soil and retaining water, which enables it to become an environmentally friendly material and be concerned. However, due to the extremely poor thermoplastic process ability thereof, it is rarely used as a thermoplastic for processing and molding.

According to the present invention, the polyvinyl alcohol (PVA) is effectively plasticized, internally and externally processed and lubricated, so that polyvinyl alcohol is effectively processed and molded through thermoplastic processing to prepare the shopping bag of the present invention. In the present invention, the shopping bag not only has thermoplastic processing moldability, but also has biodegradability and water solubility, and visual disappearance can be generated under the condition of contacting water after use, so as to realize visible degradation and effective environmental protection.

SUMMARY OF THE INVENTION

The present invention is intended to overcome the defects of the existing products and the products in use, and provide a preparation method for a biodegradable shopping bag with water solubility. The specific technical solution is as follows.

A water-soluble shopping bag comprises the following components according to parts by weight:

| | |
|---|---|
| polyvinyl alcohol (PVA) | 100 |
| composite plasticizer | 8-20 |
| polysaccharide and the derivative thereof | 10-30 |
| processing aid | 1-5 |
| film slipping agent | 0.1-0.5 and |
| film anti-blocking agent | 0.5-3.0. |

Further as an improvement of the technical solution of the present invention, the polyvinyl alcohol (PVA) is partially alcoholized polyvinyl alcohol with a polymerization degree of 300 to 2400 and an alcoholysis degree of 88%, which specifically comprises more than one powder materials with brand names of PVA-0388, PVA-0588, PVA-1788, PVA-2088, PVA-2288 and PVA-2488.

Further as an improvement of the technical solution of the present invention, the composite plasticizer comprises polyol, polyol ether and fatty acid amine or fatty alcohol amine, and the composite plasticizer is composed of polyol, polyol ether and fatty acid amine or fatty alcohol amine in a mass ratio of 6:3:1.

Further as an improvement of the technical solution of the present invention, the polyol is water-soluble polyol, which comprises one of glycerol, ethylene glycol, diethylene glycol, sorbitol, trimethylolpropane, pentaerythritol and mannitol.

Further as an improvement of the technical solution of the present invention, the polyol ether is water-soluble polyol ether, which comprises one of ethylene glycol monoethyl ether, ethylene glycol diethyl ether, ethylene glycol butyl ether and ethylene glycol methyl ether.

Further as an improvement of the technical solution of the present invention, the fatty acid amine or fatty alcohol amine is water-soluble fatty acid amine or fatty alcohol amine, which comprises one of ethylenediamine, diethanolamine and triethanolamine.

Further as an improvement of the technical solution of the present invention, the polysaccharide and the derivative thereof is selected from alkyl glycoside substances (AGP) synthesized from renewable natural fatty alcohol and glucose, which are internationally recognized and preferred "green and environmental-friendly materials", not only have high surface activity, but also have good ecological safety and compatibility, and are mild, non-toxic, non-irritating and easy to biodegrade. The polysaccharide and the derivative thereof comprise one of AGP0810, AGP1214, AGP0814, AGP0816 and AGP1216.

Further as an improvement of the technical solution of the present invention, the processing aid is selected from a processing aid for helping the thermoplastic molding of the polyvinyl alcohol in the thermoplastic processing of the polyvinyl alcohol, which mainly comprises an internal lubrication processing aid and an external lubrication processing aid. The processing aid is composed of an inner lubricant and an outer lubricant in a mass ratio of 8:2.

Further as an improvement of the technical solution of the present invention, the internal lubrication processing aid is selected from polyethylene oxide (PEO) which not only is a water-soluble polymer, but also has excellent thermoplastic processability, and has compatibility with the polyvinyl alcohol (PVA). The internal lubrication processing aid comprises one of PE0-3, PE0-6, PE0-8, PE0-10 and PE0-15.

Further as an improvement of the technical solution of the present invention, the external lubricant is selected from saturated fatty acid or saturated fatty alcohol with a carbon chain of 12 to 18. The saturated fatty acid comprises one of dodecanoic acid, tetradecanoic acid (myristic acid), hexadecanoic acid (palmitic acid) and octadecanoic acid (stearic acid). The fatty alcohol comprises one of lauryl alcohol, tetradecyl alcohol (myristic alcohol), hexadecyl alcohol (palmityl alcohol) and octadecyl alcohol (stearyl alcohol).

Further as an improvement of the technical solution of the present invention, the film slipping agent is alkyl fatty acid, alkyl fatty acid salt or alkyl fatty amide.

Further as an improvement of the technical solution of the present invention, the alkyl fatty acid comprises stearic acid.

Further as an improvement of the technical solution of the present invention, the alkyl fatty acid salt comprises monovalent stearate or sodium oleate, and the monovalent stearate comprises sodium stearate and potassium stearate.

Further as an improvement of the technical solution of the present invention, the alkyl fatty amide comprises one of stearamide, oleamide and erucamide.

Further as an improvement of the technical solution of the present invention, the film anti-blocking agent is selected from superfine inorganic powder with a grain size of 5000-8000 mesh, which comprises one of talcum powder, light calcium carbonate, white carbon black and titanium dioxide.

A preparation method for any of the water-soluble shopping bag above-mentioned comprises the following steps: mixing the components according to the parts by weight, extruding the mixture by means of a twin screw extruder to form pellets after mixing, then performing blow molding to form a film by means of a thermoplastic extrusion and film blowing machine, and then preparing various types and sizes of water-soluble shopping bags by means of a bag making machine.

Further as an improvement of the technical solution of the present invention, the mixing is carried out in a high-speed mixer, and the components are stirred at a low speed of 200 r/min for 3 to 5 min and then stirred at a high speed of 1000 r/min for 20 min, and a material temperature is controlled to not exceeding 60° C.; and finally, the speed is changed to a low speed of 200 r/min and the mixture is discharged for later use when the temperature is reduced below 30° C.

Further as an improvement of the technical solution of the present invention, a temperature for extruding to form pellets is 120° C./140° C./150° C./160° C./170° C./180° C./180° C./180° C./180° C./180° C.

Further as an improvement of the technical solution of the present invention, a temperature for performing blow molding to form a film is 140° C./160° C./180° C./185° C./185° C./180° C.

Further as an improvement of the technical solution of the present invention, a thickness of the water-soluble film obtained by blow molding is 10 to 80 μm.

Further as an improvement of the technical solution of the present invention, the various types of water-soluble shopping bags comprise vest bags and flat-rim bags with or without connectable edges, and the prepared water-soluble shopping bags are transparent, semitransparent or opaque bags, and can be prepared into various colors.

Compared with the prior art, the present invention has the following advantages and technical effects:

(1) the water-soluble shopping bag of the present invention has biodegradability, higher bearing capacity and cold water solubility;

(2) the water-soluble shopping bag of the present invention has lower biological oxygen consumption and chemical oxygen consumption in the natural environment, and does not pollute and harm the soil and the water source after dissolving into the soil and the water source;

(3) the water-soluble shopping bag of the present invention does not generate white pollution after being used; and (4) the shopping bag of the present invention has a wide source of materials, most of the materials are based on renewable resources; the shopping bag of the present invention are cheaper than shopping bags produced from other completely biodegradable materials, and are suitable for use in an anhydrous environment, and quickly "disappear" in a water-contacting environment after being used.

DETAILED DESCRIPTION OF THE EMBODIMENTS

The present invention is further described in detail below with reference to detailed embodiments, but the implementation and protection scope of the present invention is not limited thereto.

Figure 1:
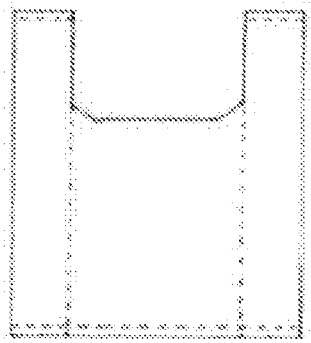
FIG. 1 is a diagram illustrating a shape of a water-soluble shopping bag prepared according to the present invention.
Figure 2A:
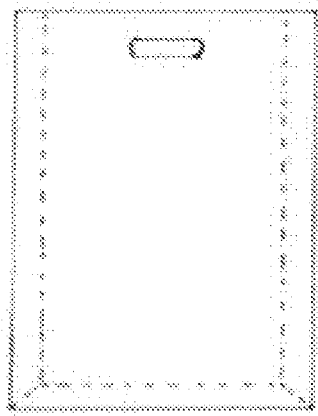
FIG. 2a is a diagram illustrating the shape of the water-soluble shopping bag prepared according to the present invention.
Figure 2B:
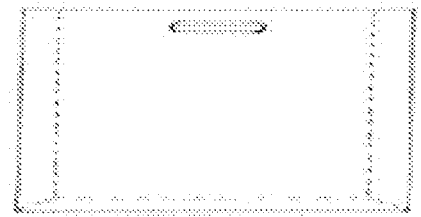
FIG. 2b is a diagram illustrating the shape of the water-soluble shopping bag prepared according to the present invention.
Figure 3A:
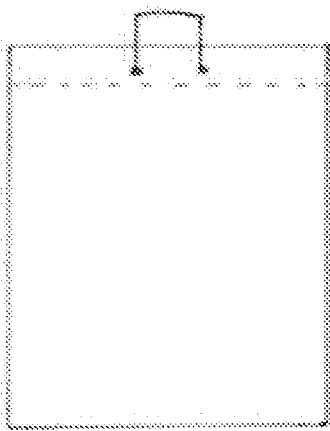
FIG. 3a is a diagram illustrating the shape of the water-soluble shopping bag prepared according to the present invention.
Figure 3B:
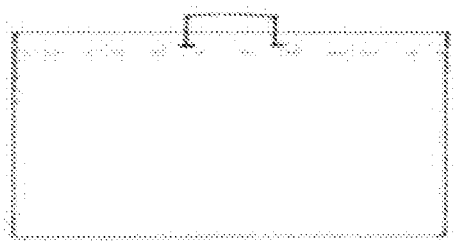
FIG. 3b is a diagram illustrating the shape of the water-soluble shopping bag prepared according to the present invention.
Figure 4A:
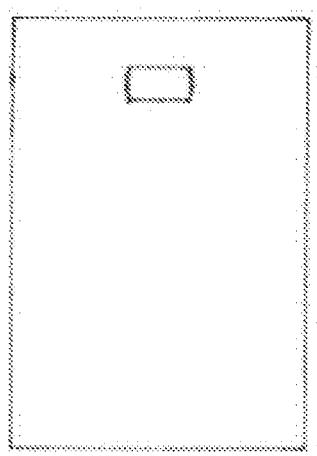
FIG. 4a is a diagram illustrating the shape of the water-soluble shopping bag prepared according to the present invention.
Figure 4B:
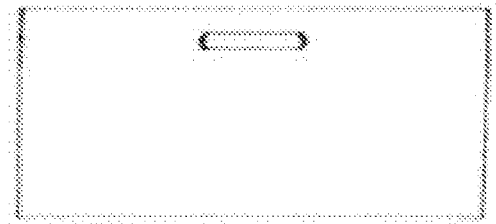
FIG. 4b is a diagram illustrating the shape of the water-soluble shopping bag prepared according to the present invention.

A water-soluble shopping bag according to the embodiments may have various shapes, as shown in FIG. 1, FIG. 2a, FIG. 2b, FIG. 3a, FIG. 3b, FIG. 4a and FIG. 4b.

Embodiment 1

A water-soluble shopping bag consists of the following components according to parts by weight:

| | |
|---|---|
| polyvinyl alcohol (PVA-1788) | 60 |
| polyvinyl alcohol (PVA-0588) | 40 |
| glycerol | 4.8 |
| ethylene glycol butyl ether | 2.4 |

-continued

| | |
|---|---|
| diethanolamine | 0.8 |
| alkyl glycoside (AGP0816) | 30 |
| PE0-10 | 0.8 |
| hexadecyl alcohol | 0.2 |
| sodium stearate | 0.1 and |
| talcum powder (5000 mesh) | 0.5. |

The components above were added into a high-speed mixer after accurate measurement and mixed at a low speed of 200 r/min for 3 min; then stirred at a high speed of 1000 r/min for 20 min, a material temperature being controlled to not exceed 60° C.; and then, the speed was changed to a low speed of 200 r/min and the mixture was discharged for later use when the temperature was reduced to a room temperature;

after high-speed stirring and mixing, the mixture above was fed into a twin screw extruder to extrude to form pellets, and the temperature for extruding to form pellets was controlled to be: 120° C./140° C./150° C./160° C./170° C./180° C./180° C./180° C./180° C./180° C.;

after extruding to form pellets, the materials were subjected to blow molding to form a film by means of an extrusion and film blowing machine, and the temperature for performing blow molding to form a film was controlled to be 140° C./160° C./180° C./185° C./185° C./180° C.;

after thermoplastic extrusion and blow molding, the materials were prepared into a vest bag with a connectable edge (7.5 cm) with a width of 30 cm, a height of 45 cm and a thickness of 35 μm (FIG. 1), and the vest bag had a maximum bearing capacity of 8 kg in an anhydrous environment and a completely dissolved time of 3 min in cold water at a room temperature (23° C.).

Embodiment 2

A water-soluble shopping bag consists of the following components according to parts by weight:

| | |
|---|---|
| polyvinyl alcohol (PVA-2088) | 100 |
| ethylene glycol | 12 |
| ethylene glycol methyl ether | 6 |
| triethanolamine | 2 |
| alkyl glycoside (AGP1214) | 10 |
| PE0-6 | 4 |
| tetradecanoic acid | 1 |
| sodium oleate | 0.5 and |
| titanium dioxide (8000 mesh) | 3. |

The components above were added into a high-speed mixer after accurate measurement and mixed at a low speed of 200 r/min for 5 min; then stirred at a high speed of 1000 r/min for 20 min, a material temperature being controlled to not exceed 60° C.; and then, the speed was changed to a low speed of 200 r/min and the mixture was discharged for later use when the temperature was reduced to 28° C.;

after high-speed stirring and mixing, the mixture above was fed into a twin screw extruder to extrude to form pellets, and the temperature for extruding to form pellets was controlled to be: 120° C./140° C./150° C./160° C./170° C./180° C./180° C./180° C./180° C./180° C.;

after extruding to form pellets, the materials were subjected to blow molding to form a film by means of an extrusion and film blowing machine, and the temperature for performing blow molding to form a film was controlled to be 140° C./160° C./180° C./185° C./185° C./180° C.;

after thermoplastic extrusion and blow molding, the materials were prepared into a flat-rim bag with a connectable edge (6.0 cm) with a width of 40 cm, a height of 60 cm and a thickness of 45 μm (FIG. 2a), and the flat-rim bag had a maximum bearing capacity of 12 kg in an anhydrous environment and a completely dissolved time of 5 min in cold water at a room temperature (23° C.).

Embodiment 3

A water-soluble shopping bag consists of the following components according to parts by weight:

| | |
|---|---|
| polyvinyl alcohol (PVA-2488) | 50 |
| polyvinyl alcohol (PVA-0388) | 50 |
| trimethylolpropane | 6 |
| ethylene glycol methyl ether | 3 |
| ethylenediamine | 1 |
| alkyl glycoside (AGP0810) | 20 |
| PE0-6 | 2.4 |
| octodecyl alcohol | 0.6 |
| stearamide | 0.3 and |
| white carbon black (6000 mesh) | 1. |

The components above were added into a high-speed mixer after accurate measurement and mixed at a low speed of 200 r/min for 4 min; then stirred at a high speed of 1000 r/min for 20 min, a material temperature being controlled to not exceed 60° C.; and then, the speed was changed to a low speed of 200 r/min and the mixture was discharged for later use when the temperature was reduced to a room temperature;

after high-speed stirring and mixing, the mixture above was fed into a twin screw extruder to extrude to form pellets, and the temperature for extruding to form pellets was controlled to be: 120° C./140° C./150° C./160° C./170° C./180° C./180° C./180° C./180° C./180° C.;

after extruding to form pellets, the materials were subjected to blow molding to form a film by means of an extrusion and film blowing machine, and the temperature for performing blow molding to form a film was controlled to be 140° C./160° C./180° C./185° C./185° C./180° C.;

after thermoplastic extrusion and blow molding, the materials were prepared into a flat-rim bag with a connectable edge (3.0 cm) with a width of 20 cm, a height of 30 cm and a thickness of 10 μm (FIG. 3a), and the flat-rim bag had a maximum bearing capacity of 2 kg in an anhydrous environment and a completely dissolved time of 1 min in cold water at a room temperature (23° C.).

Embodiment 4

A water-soluble shopping bag consists of the following components according to parts by weight:

| | |
|---|---|
| polyvinyl alcohol (PVA-1788) | 80 |
| polyvinyl alcohol (PVA-0388) | 20 |
| glycerol | 9 |
| ethylene glycol monoethyl ether | 4.5 |
| triethanolamine | 1.5 |
| alkyl glycoside (AGP1216) | 15 |
| PE0-8 | 3.2 |
| hexadecyl alcohol | 0.8 |
| erucamide | 0.2 and |
| white carbon black (7000 mesh) | 2. |

The components above were added into a high-speed mixer after accurate measurement and mixed at a low speed of 200 r/min for 5 min; then stirred at a high speed of 1000 r/min for 20 min, a material temperature being controlled to not exceed 60° C.; and then, the speed was changed to a low speed of 200 r/min and the mixture was discharged for later use when the temperature was reduced to a room temperature;

after high-speed stirring and mixing, the mixture above was fed into a twin screw extruder to extrude to form pellets, and the temperature for extruding to form pellets was controlled to be: 120° C./140° C./150° C./160° C./170° C./180° C./180° C./180° C./180° C./180° C.;

after extruding to form pellets, the materials were subjected to blow molding to form a film by means of an extrusion and film blowing machine, and the temperature for performing blow molding to form a film was controlled to be 140° C./160° C./180° C./185° C./185° C./180° C.;

after thermoplastic extrusion and blow molding, the materials were prepared into a flat-rim bag with a width of 45 cm, a height of 60 cm and a thickness of 80 μm (FIG. 4a), and the flat-rim bag had a maximum bearing capacity of 15 kg in an anhydrous environment and a completely dissolved time of 10 min in cold water at a room temperature (23° C.).

The embodiments above are only used for illustrating the technical solution of the present invention instead of limiting the present invention. Although the present invention has been described in detail with reference to preferred embodiments, those skilled in the art shall understand that the specific embodiments of the present invention can still be modified or some technical features can be replaced equally without departing from the spirit of the technical solution of the present invention, which shall be included in the scope of the technical solution requested by the present invention.

The invention claimed is:

1. A water-soluble shopping bag, comprising the following components according to parts by weight:

| | |
|---|---|
| polyvinyl alcohol | 100, |
| composite plasticizer | 8-20, |
| polysaccharide and the derivative thereof | 10-30, |
| processing aid | 1-5, |
| film slipping agent | 0.1-0.5, |
| film anti-blocking agent | 0.5-3.0, | wherein the polyvinyl alcohol is selected from partially alcoholized polyvinyl alcohol with a polymerization degree of 300 to 2400 and an alcoholysis degree of 88%, which specifically comprises more than one powder materials of PVA-0388, PVA-0588, PVA-1788, PVA-2088, PVA-2288 and PVA-2488;

wherein the composite plasticizer comprises polyol, polyol ether and fatty acid amine or fatty alcohol amine;

wherein the polyol ether is water-soluble polyol ether, which comprises one of ethylene glycol monoethyl ether, ethylene glycol diethyl ether, ethylene glycol butyl ether and ethylene glycol methyl ether;

wherein the processing aid comprises an internal lubrication processing aid and an external lubrication processing aid;

wherein the external lubrication processing aid is selected from saturated fatty acid or saturated fatty alcohol with a carbon chain of 12 to 18, the fatty acid comprises one of dodecanoic acid, tetradecanoic acid, hexadecanoic acid and octadecanoic acid, and the fatty alcohol comprises one of lauryl alcohol, tetradecyl alcohol, hexadecyl alcohol and octadecyl alcohol.

2. The water-soluble shopping bag according to claim 1, wherein the composite plasticizer is comprised of polyol, polyol ether and fatty acid amine or fatty alcohol amine in a mass ratio of 6:3:1.

3. The water-soluble shopping bag according to claim 1, wherein the polyol is water-soluble polyol, which comprises one of glycerol, ethylene glycol, diethylene glycol, sorbitol, trimethylolpropane, pentaerythritol and mannitol.

4. The water-soluble shopping bag according to claim 1, wherein the fatty acid amine or fatty alcohol amine is water-soluble which comprises one of ethylenediamine, diethanolamine and triethanolamine.

5. The water-soluble shopping bag according to claim 1, wherein the polysaccharide and the derivative thereof is selected from alkyl glycoside substances synthesized from renewable natural fatty alcohol and glucose, which comprise one of AGP0810, AGP1214, AGP0814, AGP0816 and AGP1216.

6. The water-soluble shopping bag according to claim 1, wherein the internal lubrication processing aid is selected from polyethylene oxide, which comprises one of PEO-3, PEO-6, PEO-8, PEO-10 and PEO-15.

7. The water-soluble shopping bag according to claim 1, wherein the internal lubrication processing aid and the external lubrication processing aid have a mass ratio of 8:2 in the processing aid.

8. The water-soluble shopping bag according to claim 1, wherein the film slipping agent is one of alkyl fatty acid, alkyl fatty acid salt or alkyl fatty amide.

9. The water-soluble shopping bag according to claim 8, wherein the alkyl fatty acid comprises stearic acid.

10. The water-soluble shopping bag according to claim 8, wherein the alkyl fatty acid salt is sodium oleate or monovalent stearate, and monovalent stearate is selected from sodium stearate and potassium stearate.

11. The water-soluble shopping bag according to claim 8, wherein the alkyl fatty amide comprises one of stearamide, oleamide and erucamide.

12. The water-soluble shopping bag according to claim 1, wherein the film anti-blocking agent is selected from superfine inorganic powder with a grain size of 5000-8000 mesh, which comprises one of talcum powder, light calcium carbonate, white carbon black and titanium dioxide.

13. A preparation method for the water-soluble shopping bag according to claim 1, comprising the following steps:

mixing the components into a mixture according to the parts by weight;

extruding the mixture by means of a twin screw extruder to form pellets after mixing;

performing blow molding to form a film utilizing a thermoplastic extrusion and film blowing machine; and preparing various types and sizes of water-soluble shopping bags utilizing a bag making machine.

14. The preparation method for the water-soluble shopping bag according to claim 13, wherein the mixing is carried out in a high-speed mixer, and the components are stirred at a low speed of 200 r/min for 3 to 5 min, then stirred at a high speed of 1000 r/min for 20 min, and a material temperature is controlled to not exceed 60° C.; and finally, a speed is changed to a low speed of 200 r/min and the mixture is discharged for later use when a temperature is reduced below 30° C.

15. The preparation method for the water-soluble shopping bag according to claim 13, wherein a temperature for extruding to form pellets is 120° C./140° C./150° C./160° C./170° C./180° C./180° C./180° C./180° C./180° C.

16. The preparation method for the water-soluble shopping bag according to claim 13, wherein a temperature for performing blow molding to form the film is 140° C./160° C./180° C./185° C./185° C./180° C., and a thickness of the film obtained by blow molding is 10 to 80 µm.

17. The water-soluble shopping bag according to claim 1, wherein the water soluble bag is a flat-rim bag.

* * * * *